May 11, 1948.     P. J. OVREBO     2,441,165
MEANS FOR MEASURING THE POWER OUTPUT OF RADIO TRANSMITTERS
Filed Sept. 25, 1945

INVENTOR
PAUL J. OVREBO

BY

ATTORNEY

Patented May 11, 1948

2,441,165

UNITED STATES PATENT OFFICE 2,441,165

MEANS FOR MEASURING THE POWER OUTPUT OF RADIO TRANSMITTERS

Paul J. Ovrebo, Dayton, Ohio

Application September 25, 1945, Serial No. 618,593

11 Claims. (Cl. 201—63)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radio transmitters and particularly to means for measuring the power output thereof.

In the measurement of radio-frequency power it is customary to use a dummy load which is matched to the transmitter by suitable matching impedances. Improper matching of the load to the transmitter may result in erroneous measurements as well as damage to the equipment. It is an object of this invention to insure that the load is properly matched at all times without the necessity of adjusting any tuning stubs or like devices.

In accordance with the invention there is provided a lamp load comprising a filament arranged as the central conductor of a concentric line which is mounted inside a glass tube containing hydrogen or other medium for the dissipation of heat. The outer conductor of the concentric line is in the form of a perforated cylinder or screen. The load is permanently adjusted to the desired impedance in the construction of the lamp and requires no further tuning.

For a better understanding of the invention together with other objects thereof reference is had to the following detailed description taken in connection with the accompanying drawing in which.

Figure 1:
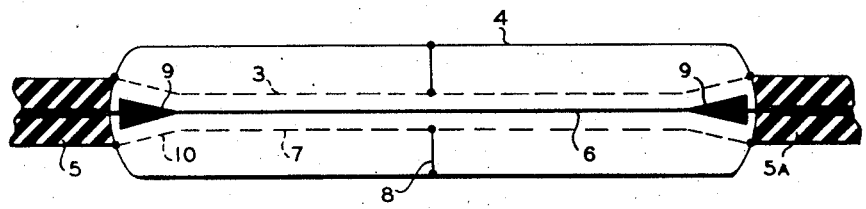
Fig. 1 is a schematic illustration of one embodiment of the invention.

Referring to the form of the invention shown in Fig. 1, a concentric line 3 is mounted within a glass envelope 4. The terminals of the line 3 are brought out through the ends of the envelope 4 and are connected in any convenient way to the coaxial cables 5 and 5a, suitable glass seals being provided at the junctions of the cables 5 and 5a with the line 3. The cable portion 5 connects the lamp load to the radio-frequency power source which is being tested, the unit being terminated at the end remote from the source by short-circuiting cable portion 5a.

The line 3 comprises a central conductor in the form of a straight filament 6, which serves as a resistance element, and an outer cylindrical conductor consisting of a silvered screen or grid 7 which may be held in position by one or more supports 8 extending through the glass 4. The envelope 4 preferably is filled with a gas such as hydrogen for rapid dissipation of heat from the filament 6. The lamp may be cooled by a regulated air blast to increase the power range of the load.

The ratio of the diameters $d$ and $D$ of the conductors 6 and 7, respectively, is selected in accordance with the characteristic impedance required. Thus, for a 50-ohm line, assuming the dielectric constant to be unity, the proper ratio of $D/d$ would be 2.3. To minimize discontinuities at the terminals of the lamp the conductors 6 and 7 are tapered at their ends, as indicated at 9 and 10, thereby preserving the desired impedance.

Power dissipation can be measured in any convenient manner with the present invention. A preferred method is to arrange a photronic cell so that it is illuminated by the lamp to give a photometric indication of the output. Measurement could also be performed calorimetrically by observing the change in temperature of the cooling air blast.

Figure 2:
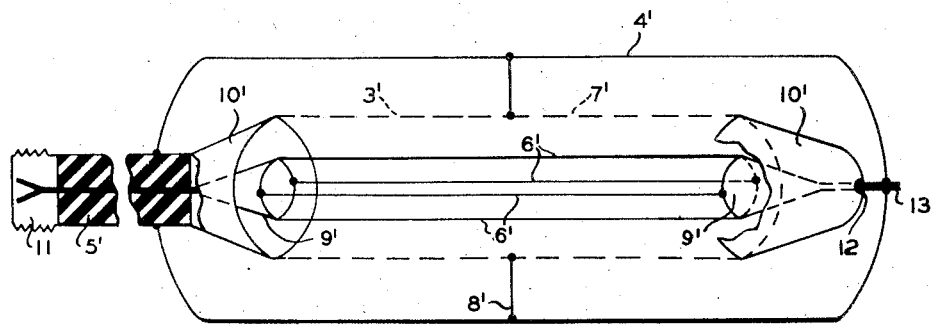
Fig. 2 is a schematic illustration of another embodiment of the invention.

A modification of the above described invention is illustrated in Fig. 2 wherein parts similar to those shown in Fig. 1 are designated by primed reference numerals. Portions of the structure are broken away in this view for clarity of illustration. In this embodiment the central conductor of the concentric line 3' is simulated by a group of spaced, parallel filaments 6'. A coaxial cable 5' is brought through one end of the glass tube 4' to which it is suitably sealed. Tapered coaxial members 9' and 10' connect the inner and outer conductors of the line 3' to the cable 5'. The screen or grid 7' may be supported at one or more points as at 8'.

A female connector jack 11 is provided on the free end of cable 5' for connecting the lamp load to the radio-frequency source. At the opposite end of the lamp the tapers 9' and 10' are joined in a radio-frequency short circuit inside the envelope 4' as indicated at 12, and a stem 13 of the inner taper 9' extends through and is sealed to the glass for support. The envelope 4' is filled with hydrogen or other heat-conducting medium as in the previous case.

The arrangement shown in Fig. 2 enables a large amount of power to be dissipated in the load. Still greater power dissipating capacity can be obtained by cooling the lamp with an air blast. The ratio of the diameters of the inner and outer conductors of the concentric line within the tube is selected to give the desired impedance, assuming a dielectric factor of unity.

While there have been disclosed several preferred embodiments of the invention, it will be apparent to those skilled in the art that many modifications can be made without departing from the spirit of the invention.

What is claimed is:

1. A lamp for use as a matched radio-frequency load, comprising a glass envelope, a gaseous heat-conducting medium contained in said envelope, a concentric line supported within said envelope, said line including a central heat-radiating conductor of single filament structure, and an outer conductor made up of a silvered screen having openings therein for the circulation of said medium.

2. A lamp for use as a matched radio-frequency load, comprising a glass envelope, a gaseous heat-conducting medium contained in said envelope, a concentric line supported within said envelope, said line including a central heat-radiating conductor made up of a group of spaced parallel filaments, and an outer conductor having openings therein for circulation of said medium.

3. A load lamp for measuring radio-frequency current on a coaxial transmission line, comprising an envelope of dielectric material, a concentric line within said envelope, said concentric line including a cylindrical outer conductor and an inner conductor of resistive material, concentric terminals extending through said envelope, from one end of said concentric line, whereby connection can be made to said coaxial transmission line.

4. A load lamp as defined in claim 3, wherein the characteristic impedance of said concentric line is substantially equal to the characteristic impedance of said coaxial transmission line.

5. A load lamp as defined in claim 3, wherein the outer conductor of the concentric line is made up of perforated material.

6. A load lamp as defined in claim 3, wherein the envelope contains a heat dissipating gas.

7. A load lamp as defined in claim 3, wherein the inner conductor of the concentric line is operably subject to incandescence.

8. A load lamp as defined in claim 3, wherein the inner conductor is made of material appreciably heated by current operably passing therethrough.

9. A load lamp as defined in claim 3, wherein there is a second set of concentric terminals extending from the other end of said concentric line through said envelope.

10. A load lamp as defined in claim 3, wherein the inner conductor of the concentric line comprises a plurality of spaced parallel filaments arranged in a cylindrical plane about a common axis.

11. A load lamp as defined in claim 3, wherein the inner and outer conductors of the concentric line are electrically interconnected within the envelope substantially at the ends of said conductors remote from the terminals aforesaid.

PAUL J. OVREBO.

REFERENCES CITED

The following references are of record in the file of this patent:

UNITED STATES PATENTS

| Number | Name | Date |
|---|---|---|
| 2,144,888 | Meyer et al. | Jan. 24, 1939 |

FOREIGN PATENTS

| Number | Country | Date |
|---|---|---|
| 46,494 | Switzerland | Jan. 25, 1909 |